United States Patent
Raorane

(10) Patent No.: US 9,128,948 B1
(45) Date of Patent: Sep. 8, 2015

(54) INTEGRATION OF DEDUPLICATING BACKUP SERVER WITH CLOUD STORAGE

(75) Inventor: Guruprasad Balkrishna Raorane, Pune (IN)

(73) Assignee: Symantec Corporation, Mountain View, CA (US)

( * ) Notice: Subject to any disclaimer, the term of this patent is extended or adjusted under 35 U.S.C. 154(b) by 424 days.

(21) Appl. No.: 12/882,532

(22) Filed: Sep. 15, 2010

(51) Int. Cl.
*G06F 17/30* (2006.01)

(52) U.S. Cl.
CPC ................................ *G06F 17/30138* (2013.01)

(58) Field of Classification Search
None
See application file for complete search history.

(56) References Cited

U.S. PATENT DOCUMENTS

| | | | |
|---|---|---|---|
| 7,483,927 B2 * | 1/2009 | Anglin et al. ......................... 1/1 |
| 8,335,768 B1 * | 12/2012 | Desai et al. ................... 707/674 |
| 2009/0177661 A1 * | 7/2009 | Sandorfi et al. ................... 707/9 |
| 2010/0082558 A1 * | 4/2010 | Anglin et al. .................. 707/694 |
| 2010/0191783 A1 * | 7/2010 | Mason et al. .................. 707/822 |
| 2010/0274765 A1 * | 10/2010 | Murphy et al. ................ 707/652 |
| 2010/0274983 A1 * | 10/2010 | Murphy et al. ................ 711/162 |
| 2010/0333116 A1 * | 12/2010 | Prahlad et al. ................ 719/328 |
| 2011/0161723 A1 * | 6/2011 | Taleck et al. ................. 714/4.11 |
| 2011/0167221 A1 * | 7/2011 | Pangal et al. ................. 711/117 |
| 2011/0246734 A1 * | 10/2011 | Umbehocker ................ 711/162 |
| 2012/0005379 A1 * | 1/2012 | Dutch et al. ..................... 710/31 |
| 2013/0144840 A1 * | 6/2013 | Anglin et al. ................. 707/640 |

* cited by examiner

*Primary Examiner* — Neveen Abel Jalil
*Assistant Examiner* — Tyler Torgrimson
(74) *Attorney, Agent, or Firm* — Campbell Stephenson LLP

(57) ABSTRACT

Various systems and methods can integrate a deduplicating backup server with cloud storage. For example, one method involves detecting a trigger condition associated with a storage device that stores backup images for a backup server. The method then selects to move a unit of data from the storage device to a cloud storage system, in response to detecting the trigger condition. The method selects the unit of data based on a most recent time at which the unit of data was accessed during a restore operation. The selection of the unit of data can also be based on a number of references to the unit of data, in systems in which the storage device is a deduplicated storage device.

19 Claims, 4 Drawing Sheets

INTEGRATION OF DEDUPLICATING BACKUP SERVER WITH CLOUD STORAGE

FIELD OF THE INVENTION

This invention relates to backups and, more particularly, to integrating deduplicating backup servers with cloud storage.

DESCRIPTION OF THE RELATED ART

Typically, customers purchase storage devices in anticipation of their future storage needs, such that the purchased storage devices will be in place when the customer needs more storage. Unfortunately, because of this lag between when storage is purchased and when it is used, customers often notice that by the time they actually begin using the storage, storage prices have dropped.

One solution to this problem is being provided by cloud storage systems, in which third parties provide on-demand storage to customers. The operator of the cloud storage system maintains the storage devices used to implement the cloud storage system, and simply bills customers for the amount of storage used by each customer in a particular unit of time. Thus, instead of needing to stockpile storage devices in advance of actual storage needs, a customer can instead purchase storage as it is needed from a cloud storage provider.

Unfortunately, many existing storage uses are difficult to integrate with cloud storage systems. For example, in attempt to increase storage efficiency for backups, many backup systems support deduplication. In deduplicating backup systems, a given unit of data can be referenced by multiple different backups. Thus, a unit of data in a relatively old backup image may be referenced by several relatively recent backup images. This makes it difficult to simply move older backup images to a cloud storage system, since such older backup images may actually contain data referenced by newer backup images. Accordingly, new techniques for allowing existing storage uses to be integrated with cloud storage systems are desirable.

SUMMARY OF THE INVENTION

Various systems and methods for integrating a deduplicating backup server with cloud storage are disclosed. For example, one method involves detecting a trigger condition associated with a storage device that stores backup images for a backup server. The method then selects to move a unit of data from the storage device to a cloud storage system, in response to detecting the trigger condition. The method selects the unit of data based on a most recent time at which the unit of data was accessed during a restore operation. The selection of the unit of data can also be based on a number of references to the unit of data, in systems in which the storage device is a deduplicated storage device.

The method can select to not move a second unit of data to the cloud storage system, in response to metadata associated with the second unit of data indicating that the second unit of data must be stored locally. The method can select to delete a third unit of data from the storage device, based upon a most recent time at which the third unit of data was accessed during a restore operation, if a copy of the third unit of the third unit of data is already stored on the cloud storage system when the third unit of data is selected for deletion.

The unit of data can be a first backup image of the backup images stored on the storage device. Alternatively, the unit of data can be a portion of an application file. The trigger condition can be detected when an amount of space used to store backup images on the storage device exceeds a threshold amount of space.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
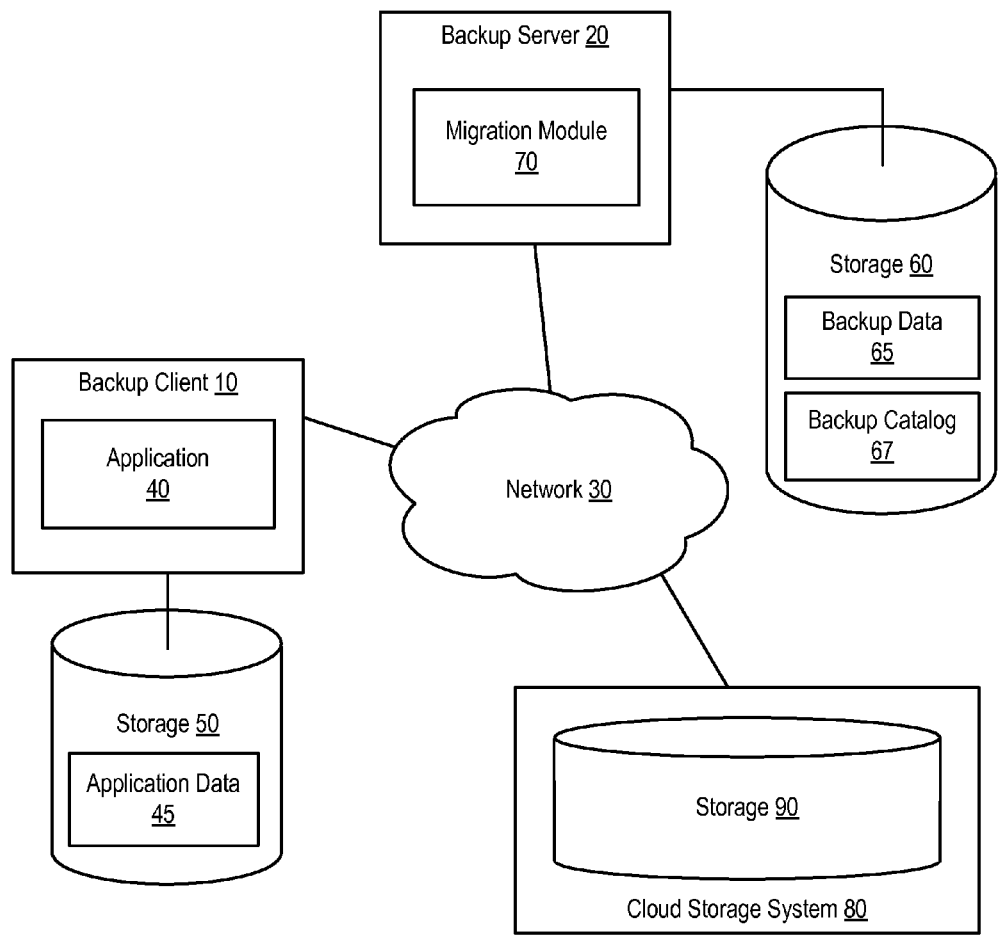
FIG. 1 is a block diagram of a system that integrates a deduplicating backup server with cloud storage, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a computing system. As shown, the computing system includes a backup client 10 and a backup server 20, coupled by a network 30. Network 30 can include a WAN (Wide Area Network), such as the Internet, one or more LANs (Local Area Networks), and/or one or more SANs (Storage Area Networks).

Backup client 10 implements an application 40 (e.g., a word processing program, email program, graphic editing program, database application, or the like), which accesses (e.g., by generating and/or consuming) application data 45 on storage device 50. Backup client 10 is a computing device such as a personal computer, laptop computer, server, personal digital assistant, cell phone, or the like. Storage device 50 can be included within and/or coupled to (e.g., via a bus, network, or other appropriate interconnect) backup client 10.

Backup server 20 is another computing device that is configured to backup application data 45 for backup client 10 by creating a point-in-time copy of application data 45 on backup server storage 60. Storage 60 can be included within and/or coupled to (e.g., via a bus, network such as a SAN, or other appropriate interconnect) backup server 20. Backup server 20 also implements an interface to access a cloud storage system 80, which includes storage 90 that can be used by backup server 20 on an on-demand basis.

Cloud storage system 80 can be operated by the same or a different party than operates backup server 20. In embodiments in which cloud storage system 80 is operated by a different party, that other party may meter (e.g., in terms of time and amount of storage space consumed) the usage of cloud storage 90 by backup server 20 in order to bill the party that operates backup server 20 for their usage of cloud storage 90.

Storage devices 50, 60, and 90 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape).

As noted briefly above, backup server 20 backs up data, such as application data 45, for backup clients such as backup client 10. When a backup is requested for a particular backup client, backup server 20 creates a backup image that is a point-in-time copy of the data stored by that backup client. Backup server 20 stores such backup images as backup data 65. Backup server 20 also maintains a backup catalog 67 that identifies each backup image and contains information usable to restore data from each identified backup image.

In at least some embodiments, backup server 20 performs data deduplication when generating backup images. Data deduplication involves reducing the number of copies of the same data that are stored as part of backup data 65. For example, data deduplication can be used to achieve single-instance storage, in which only a single copy of each unique unit of data is maintained on a storage system. Data deduplication can be performed by generating an identifier for each unit of data included in a backup image. When another copy of the same unit of data is processed for inclusion in a backup image, backup server 20 will detect that a copy of the unit of data is already included in backup data 65 and will thus not store another copy of the item of data. Instead, backup server 20 will simply create a pointer to the existing copy of the unit of data and increase a reference count associated with the existing copy of the unit of data. Detection of whether a copy of the unit of data is already stored can involve calculating an identifier (e.g., a checksum or signature) for the unit of data and comparing that identifier to the identifiers of units of data already stored within the storage system.

Backup catalog 67 identifies the location of each backup image in backup data 65 on storage 60, as well as the time at which each backup image was created. The backup catalog can also track the most recent time at which each backup image was accessed during a restore operation. In systems that perform deduplication, backup catalog 67 can also track the identifiers and size (if variable sized units of data are allowed) of each unit of data, as well as the reference count for each unit of data. Information such as the most recent time at which data was accessed during a restore operation may also be maintained for each unit of data. Such information can be stored in backup catalog 67 or associated with the appropriate unit of data in backup data 65.

Migration module 70 in backup server 20 is configured to routinely (e.g., periodically or in response to predetermined stimuli) attempt to migrate qualifying backup data 65 from storage 60, which is under the control of the same party as backup server 20, to cloud storage system 80 for storage in cloud storage 90. Migration module 70 can be configured to detect one or more trigger conditions such as the current amount of storage space used to storage backup data 65 within storage 60, the overall current amount of storage space used within storage 60, the expiration of a timer, the relative amount of storage space used to storage backup data 65 within storage 60, and the like, and to attempt to migrate backup data 65 to cloud storage system 80 in response to detection of such a trigger condition (or a set of such trigger conditions). For example, migration module 70 can be configured to detect when the amount of storage space used by backup server 20 in storage device 60 exceeds a threshold amount.

Once a trigger condition is detected, migration module 70 uses metadata associated with the units of data included in backup data 65 to select one or more qualifying units of data to cloud storage system 80. The metadata can be included in backup catalog 67 and/or stored along with the units of data in backup data 65. Such metadata can include the most recent time at which a unit of data was accessed as part of a restore operation and the reference count associated with the unit of data. Additionally, such metadata can identify units of data that are not candidates for migration (i.e., units of data that must remain stored in storage 60) as well as units of data for which a remote copy (e.g., in cloud storage system 80) must be maintained.

In response to identifying a qualifying unit of data, migration module 70 can send a copy of that unit of data to cloud storage system 80 for storage in cloud storage 90. After the copy has been stored in cloud storage 90, migration module 70 can, if allowed, delete the copy of that unit of data from storage 60. Certain associated metadata (e.g., such as the most recent access time) can also be copied to cloud storage system and deleted from storage 60 as part of this process. This process of copying to the cloud storage and deleting the local copy is referred to herein as migration. Typically, the metadata associated with migrated units of data that is included in backup catalog 67 is not migrated along with those units of data. Whenever a unit of data is migrated, backup catalog 67 can be updated to indicate that the unit of data is now stored within cloud storage system 80 instead of local storage 60.

Thus, the amount of local storage space required to store backup data 65 can be kept at a desired level by routinely migrating at least a portion of backup data 65 to cloud storage system 80. This can help the operator of backup server 20 manage the costs of storage needed to maintain backup data 65.

When a restore operation is performed, backup server 20 accesses backup catalog 67 to determine where the backup image from which data is being restored is located (e.g., relative to storage 60 and/or cloud storage 90). If a unit of data (e.g., the backup image or a portion of the backup image) is stored in storage 60, backup server 20 simply updates the most recent access time associated with that unit of data and performs the restore using the copy available in storage 60. If instead the unit of data is stored in cloud storage 90, backup server 20 retrieves the unit of data from cloud storage 90 to perform the restore. In response to fetching the unit of data from cloud storage 90, backup server 20 can create a new copy of the unit of data in storage 60 and update the most recent access time associated with that unit of data. Backup server 20 may also delete the copy of that unit of data from cloud storage 90, if allowed (e.g., if the unit of data is not designated as a unit of data for which a remote copy must be maintained).

Thus, by using the most recent access time and, in deduplication systems, the reference count to identify qualifying backup data to migrate, migration module 70 can (at least in some embodiments) maintain a relatively high level of performance for restore operations, despite the fact that at least some of backup data 65 is no longer stored locally. This performance level arises from the observation that data that has been accessed recently is likely to be accessed again in the near future (temporal locality), as well as the fact that data that is referenced more frequently in a deduplication system is more likely to be accessed during any given restore operation.

The unit of data that this process acts on can have a variety of different logical constraints. For example, in one embodiment, units of data are backup images. In another embodiment, units of data are file system clusters, which are the basic units of storage space that the file system allocates to store files and directories. In yet other embodiments, units of data are files or portions of files. Portions of files can be described as chunks of application data. A chunk can be defined by the particular application that generated that chunk of data. Depending upon the application, such chunks can be constant or variable in length. In the latter case (such chunks can also be referred to as extents), the chunk can be identified by a starting address and either an ending address or a length. Generally, a chunk is a logical subdivision of a file whose starting and ending points are unrelated to the underlying physical storage space in which a copy of the file is stored. In other words, the size and alignment of a chunk of a file does not need to be related to the underlying blocks in which the file is stored.

As noted above, migration module 70 is configured to select which units of data, if any, to migrate to the cloud storage system at run time, based upon dynamically changing metadata. This differs from implementations that use preassigned, fixed criteria to identify the relative priorities of data.

In some embodiments, migration module 70 may routinely (e.g., periodically and/or in response to predetermined stimuli) verify backups which are distributed across local storage 60 and cloud storage 90. To do so, migration module 70 can verify the deduplication signature (e.g., a checksum or other hash) of each unit of data. To verify units of data stored on cloud storage 90, migration module 70 can, in some embodiments, simply verify the existence of those units of data on cloud storage 90. No restore or read operations need to be performed for the units of data stored on cloud storage 90 during this verification process.

Figure 2:
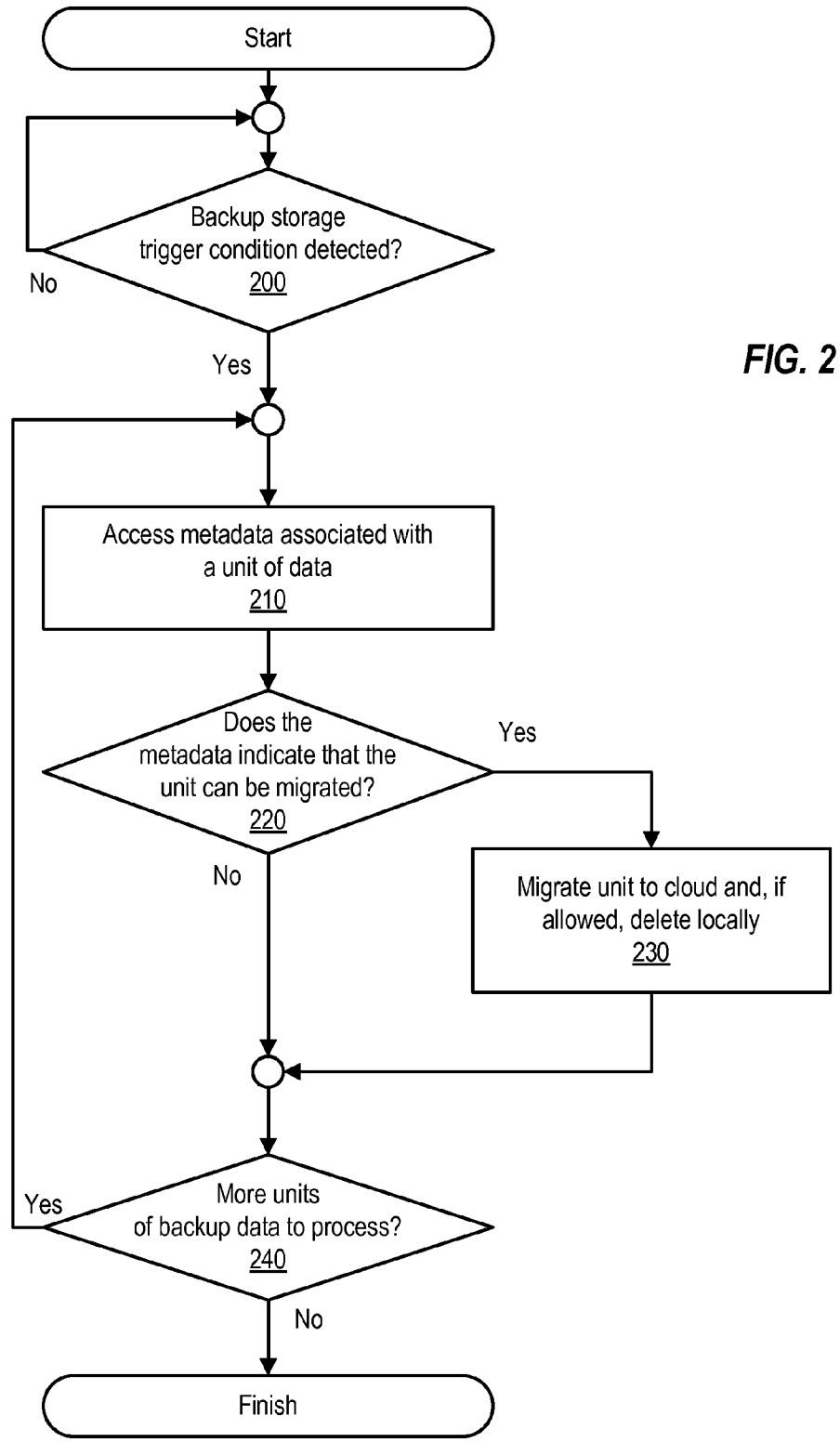
FIG. 2 is a flowchart of a method of integrating a deduplicating backup server with cloud storage, according to one embodiment of the present invention.

FIG. 2 is a flowchart of a method of integrating a backup server with a cloud storage system. This method can be performed by a backup server that implements a migration module, such as migration module 70 of FIG. 1.

The method begins at 200, when the migration module detects a backup storage trigger condition. Detection of such a trigger condition can be performed by monitoring a timer or clock to detect the end of a period. Alternatively (or additionally), detection of such a trigger condition can involve monitoring the usage (e.g., in terms of space consumed, in absolute or relative terms) of a storage device used by the backup server. For example, when the amount of storage space within the storage device used by the backup server exceeds a threshold amount, the trigger condition is detected.

If the trigger condition is detected, the migration module accesses metadata (which can be stored along with the unit of data and/or in a backup catalog) associated with a unit of backup data, as shown at 210. This metadata can indicate, for example, the most recent time at which the unit of backup data was accessed during a restore process (if ever). In deduplication systems, the metadata can indicate the number of references to the unit of backup data.

The migration module then determines whether the metadata indicates that the unit of backup data can be migrated to the cloud, as shown at 220. This determination can be made by comparing the metadata to a threshold and/or by comparing the metadata to metadata associated with other units of backup data. For example, in one embodiment, the migration module can be configured to migrate only units of data that have not been accessed within the last two months and that have fewer than three references. Alternatively, the migration module can be configured to migrate only the oldest 30 percent of the units of data that have no more than one reference.

In response to the metadata indicating that the unit of data can be migrated (i.e., that the unit of data is a qualifying candidate for migration), the migration module migrates the unit of data to the cloud and, if allowed, deletes the local copy of the unit of data, as shown at 230. The migration module migrates data to the cloud by sending a copy of the data to a cloud storage system for storage therein.

At 240, the migration module determines whether there are more units of data to process. This determination can involve detecting a situation such as whether the trigger condition has been removed (e.g., has the amount of local storage space consumed by backup data been decreased below a threshold amount), whether a desired amount of backup data has been migrated, or whether there are any units of data that have not yet been processed.

Figure 3:
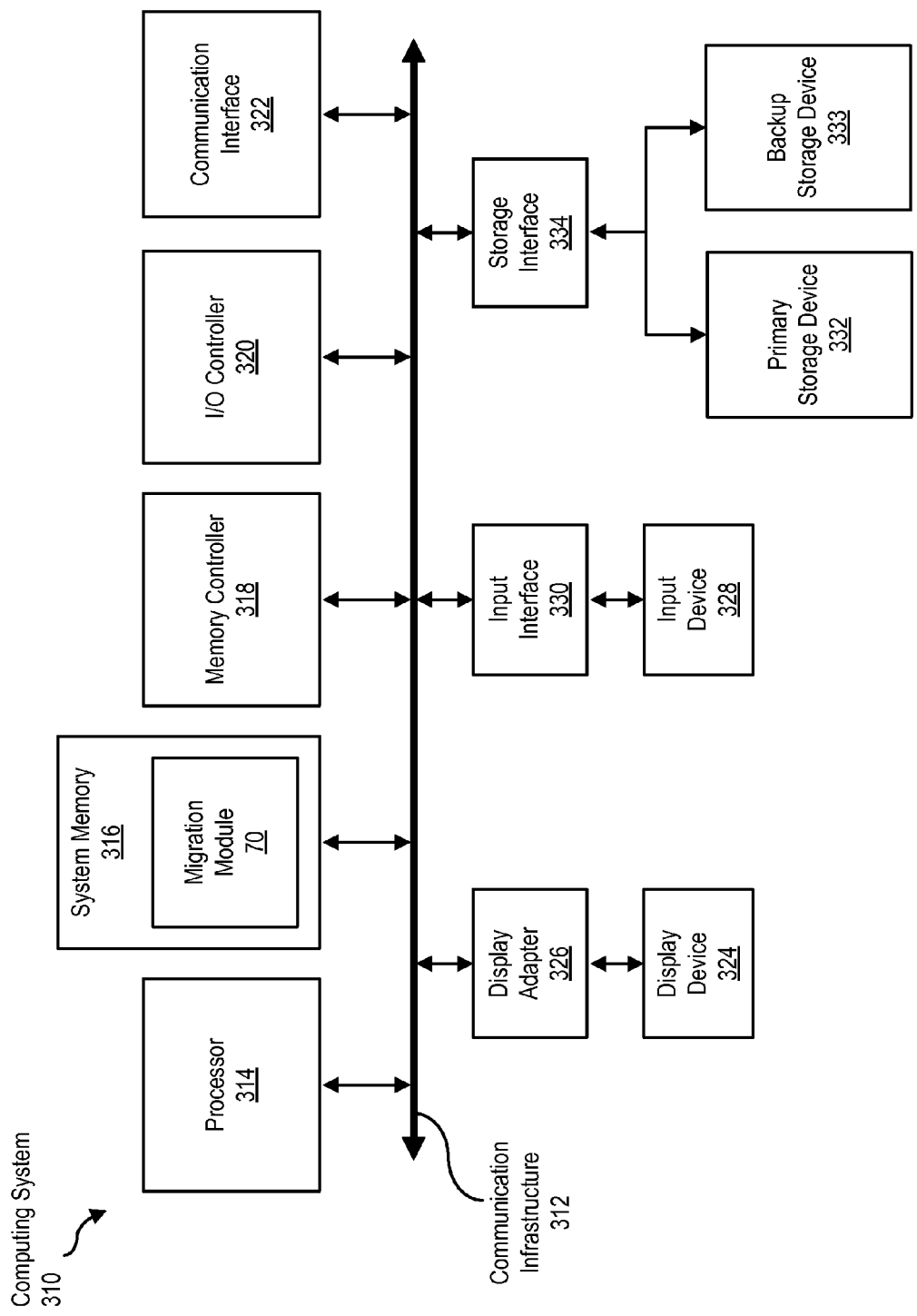
FIG. 3 is a block diagram of a computing device, illustrating how a migration module can be implemented in software, according to one embodiment of the present invention.

FIG. 3 is a block diagram of a computing system 310 capable of implementing a migration module as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a migration module, computing system 310 becomes a special purpose computing device that is configured to dynamically migrate units of backup data to a cloud storage system based upon dynamic characteristics of those units of backup data.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/ or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, primary storage device 332, as described in detail below). In one example, program instructions executable to implement a migration module 70 (e.g., as shown in FIG. 1) may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may be a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can store information such as backup images and/or a backup catalog, as described above.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
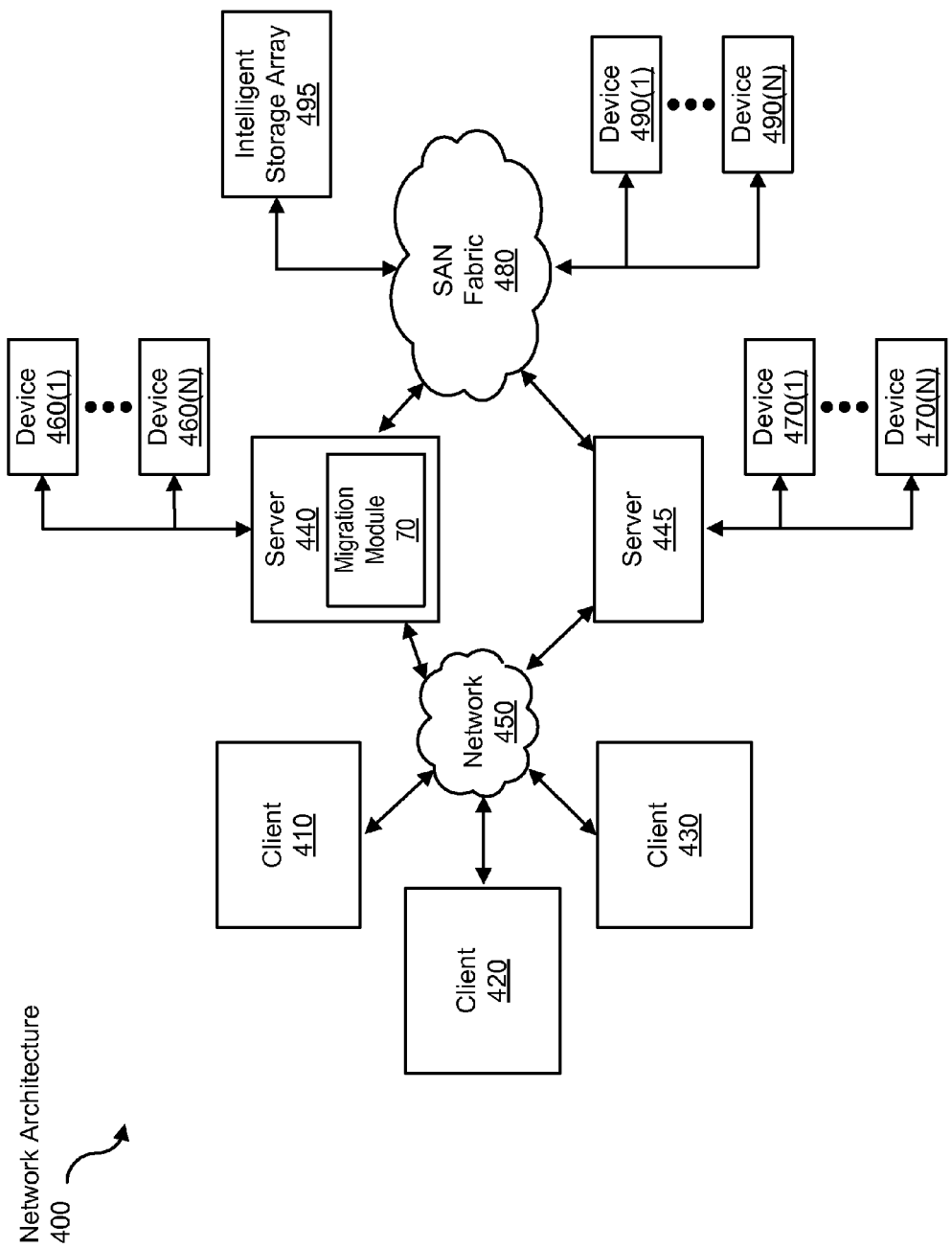
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 3.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 and/or servers 440 and/or 445 may include a common disk deduplication module as shown in FIG. 1.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS). Such storage devices can store backup images and/or backup catalogs, as described above.

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 3, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a migration module, operating as part of a backup server, may transform the backup data generated by that backup server into backup data that is distributed among the backup server's local storage and a cloud storage system.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    detecting a trigger condition associated with a storage device, wherein
        the storage device stores backup images for a backup server,
        the storage device is a deduplicated storage device, and
        the trigger condition comprises at least one of
            an amount of space used to store backup images on the storage device exceeding a threshold amount of space,
            an overall amount of space used on the storage device exceeding a threshold amount of space, or
            expiration of a timer;
    selecting to move a unit of data from the storage device to a cloud storage system, in response to the detecting;
    confirming that the unit of data qualifies for migration, wherein
        the confirming comprises
            comparing metadata identifying a most recent time at which the unit of data was accessed during a restore operation with metadata associated with other units of data, and
            determining a number of references to the unit of data within the deduplicated storage device; and
        the comparing and the determining determines whether the unit of data must be stored locally on the storage device or is already stored on the cloud storage system; and
    upon confirmation that the unit of data qualifies for migration, sending a copy of the unit of data to the cloud storage system and deleting the unit of data and metadata identifying the most recent time at which the unit of data was accessed from the storage device.

2. The method of claim 1, wherein the confirming also comprises determining a number of references to the unit of data, wherein the storage device is a deduplicated storage device.

3. The method of claim 1, further comprising selecting to not move a second unit of data to the cloud storage system, in response to metadata associated with the second unit of data indicating that the second unit of data must be stored locally.

4. The method of claim 1, further comprising selecting to delete a second unit of data from the storage device, based upon a most recent time at which the second unit of data was accessed during a restore operation, wherein a copy of the second unit of data is already stored on the cloud storage system when the second unit of data is selected for deletion.

5. The method of claim 1, wherein the unit of data is a first backup image of the backup images stored on the storage device.

6. The method of claim 1, wherein
    the unit of data comprises at least one of
        a portion of an application file,
        file system cluster, or
        a chunk.

7. A system comprising:
    one or more processors; and
    memory coupled to the one or more processors, wherein the memory stores program instructions executable by the one or more processors to:
    detect a trigger condition associated with a storage device, wherein
        the storage device stores backup images for a backup server,
        the storage device is a deduplicated storage device, and
        the trigger condition comprises at least one of
            an amount of space used to store backup images on the storage device exceeding a threshold amount of space,
            an overall amount of space used on the storage device exceeding a threshold amount of space, or
            expiration of a timer;
    select to move a unit of data from the storage device to a cloud storage system, in response to detection of the trigger condition;
    confirm that the unit of data qualifies for migration, wherein
        confirming that the unit of data qualifies for migration comprises
            comparing metadata identifying a most recent time at which the unit of data was accessed during a restore operation with metadata associated with other units of data, and
            determining a number of references to the unit of data within the deduplicated storage device; and
        the comparing and the determining determines whether the unit of data must be stored locally on the storage device or is already stored on the cloud storage system; and
    upon confirmation that the unit of data qualifies for migration, sending a copy of the unit of data to the cloud storage system and deleting the unit of data and metadata identifying the most recent time at which the unit of data was accessed from the storage device.

8. The system of claim 7, wherein
    confirming that the unit of data qualifies for migration also comprises determining a number of references to the unit of data, wherein the storage device is a deduplicated storage device.

9. The system of claim 7, wherein the program instructions are further executable to select to not move a second unit of data to the cloud storage system, in response to metadata associated with the second unit of data indicating that the second unit of data must be stored locally.

10. The system of claim 7, wherein the program instructions are further executable to select to delete a second unit of data from the storage device, based upon a most recent time at which the second unit of data was accessed during a restore operation, wherein a copy of the second unit of data is already stored on the cloud storage system when the second unit of data is selected for deletion.

11. The system of claim 7, wherein the unit of data is a first backup image of the backup images stored on the storage device.

12. The system of claim 7, wherein
    the unit of data comprises at least one of
        a portion of an application file,
        file system cluster, or
        a chunk.

13. A non-transitory computer readable storage medium storing program instructions executable by one or more processors to:
    detect a trigger condition associated with a storage device, wherein
        the storage device stores backup images for a backup server,
        the storage device is a deduplicated storage device, and
        the trigger condition comprises at least one of an amount of space used to store backup images on the storage device exceeding a threshold amount of space, an overall amount of space used on the storage device exceeding a threshold amount of space, or expiration of a timer;

select to move a unit of data from the storage device to a cloud storage system, in response to detection of the trigger condition; and confirm that the unit of data qualifies for migration, wherein confirming that the unit of data qualifies for migration comprises comparing metadata identifying a most recent time at which the unit of data was accessed during a restore operation with metadata associated with other units of data, and determining a number of references to the unit of data within the deduplicated storage device, and the comparing and the determining determines whether the unit of data must be stored locally on the storage device or is already stored on the cloud storage system; and upon confirmation that the unit of data qualifies for migration, sending a copy of the unit of data to the cloud storage system and deleting the unit of data and metadata identifying the most recent time at which the unit of data was accessed from the storage device.

14. The non-transitory computer readable storage medium of claim 13, wherein confirming that the unit of data qualifies for migration also comprises determining a number of references to the unit of data, wherein the storage device is a deduplicated storage device.

15. The non-transitory computer readable storage medium of claim 13, wherein the program instructions are further executable to select to not move a second unit of data to the cloud storage system, in response to metadata associated with the second unit of data indicating that the second unit of data must be stored locally.

16. The non-transitory computer readable storage medium of claim 13, wherein the program instructions are further executable to select to delete a second unit of data from the storage device, based upon a most recent time at which the second unit of data was accessed during a restore operation, wherein a copy of the second unit of data is already stored on the cloud storage system when the second unit of data is selected for deletion.

17. The non-transitory computer readable storage medium of claim 13, wherein the unit of data is a first backup image of the backup images stored on the storage device.

18. The non-transitory computer readable storage medium of claim 13, wherein the unit of data comprises at least one of
a portion of an application file,
file system cluster, or
a chunk.

19. The method of claim 1, wherein the cloud storage system is operated by a third-party provider, and the cloud storage system is configured to provide storage space on an on-demand basis.

\* \* \* \* \*